Nov. 10, 1942.  C. SCHMITZ ET AL  2,301,463
POWER PLANT
Filed Aug. 23, 1939  2 Sheets-Sheet 1

Inventors
Christian Schmitz +
Herman Zumpe
by Knight Bros
attorneys

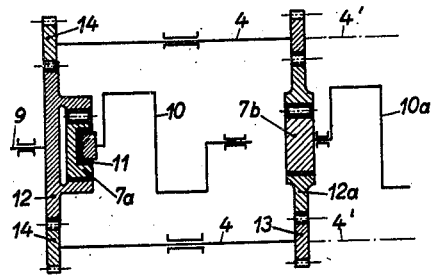
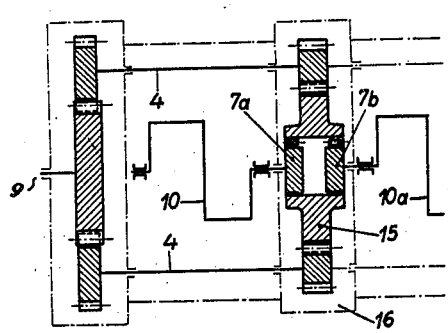
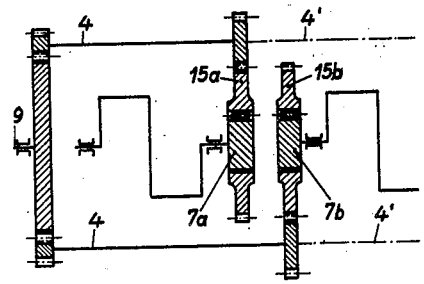
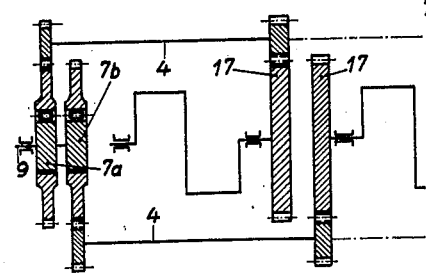
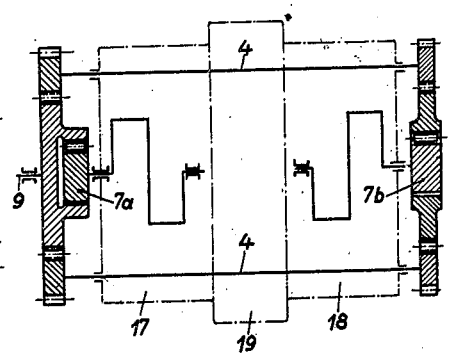
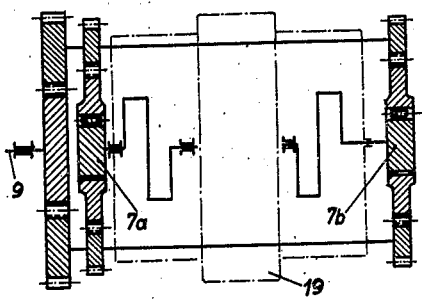
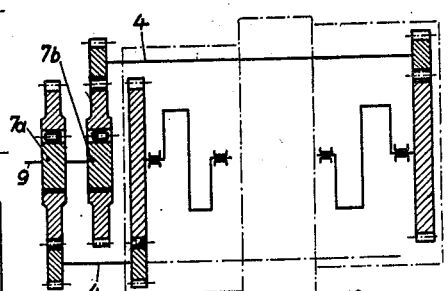

Patented Nov. 10, 1942

2,301,463

UNITED STATES PATENT OFFICE 2,301,463

POWER PLANT

Christian Schmitz, Berlin-Spandau, and Herman Zumpe, Berlin-Schmargendorf, Germany; vested in the Alien Property Custodian Application August 23, 1939, Serial No. 291,476
In Germany August 5, 1938

3 Claims. (Cl. 60—97)

The invention is for improvements in power plants, for example for aircraft, in which a plurality of radial engines, V-engines or the like, with the planes of the engine cylinders parallel to the plane of the driven airscrew, are coupled to the airscrew.

The main object of the invention is to enable the power supplied to an airscrew to be increased without increasing the engine diameter, by combining a plurality of engines into one power plant in such a manner that when one engine fails it is cut out by the other engines so that the entire power plant is not endangered thereby.

In a known arrangement a plurality of engines are connected in series with the cylinders thereof one behind the other, through shafts and couplings to the airscrew. This arrangement cannot be employed, however, with air-cooled radial engines of known construction since with a plurality of radial engines, for example with double or higher multiple radial engines, the cylinders are staggered one behind the other so as to produce uniform cooling conditions. Consequently it is impossible to mount in a smaller space a plurality of independent radial engines driving a common airscrew in such a manner as to produce an increased output.

These disadvantages are overcome according to the invention by a power plant of small diameter in which a plurality of independent radial engines are arranged one behind the other so as to operate independently of each other either individually or in common on to a single airscrew shaft. This is particularly important when one of the radial engines fails or is not required because that engine need no longer be rotated by the other engines.

This is achieved according to the invention by a power plant, for example for aircraft, comprising the combination with a plurality of internal combustion engines, such as radial aircraft engines, the corresponding cylinders of which are arranged in rows one behind the other and the crank shafts coaxial with a shaft to be driven, for example an airscrew shaft, of a plurality of by-pass shafts extending through the spaces between adjacent rows of cylinders or between the ends of the adjacent rows of cylinders within the crank casings and connected together and to the individual crank shafts by means of couplings, preferably in the form of overrunning clutches, in such a manner that when one of the engines fails or is cut out it is disengaged from the shaft to be driven whilst the remaining engines are maintained in operative connection therewith.

The transmission between each engine and the airscrew is preferably subdivided by a plurality, for example three by-pass shafts located in the radial spaces between adjacent cylinders or in the crank casing.

In this manner it is possible to mount two engines, for example of 1000 horsepower, giving a combined output of 2000 horsepower, in the gondola or hull of an aircraft without increasing the diameter thereof beyond the size hitherto necessary for one engine, with the further advantage that the engines can still readily be examined.

In order that the invention may be readily understood examples thereof will be described with reference to the accompanying drawings in which—

Figures 3 to 9 illustrate diagrammatically various modified arrangements of a driving mechanism according to the invention.

Figure 1:
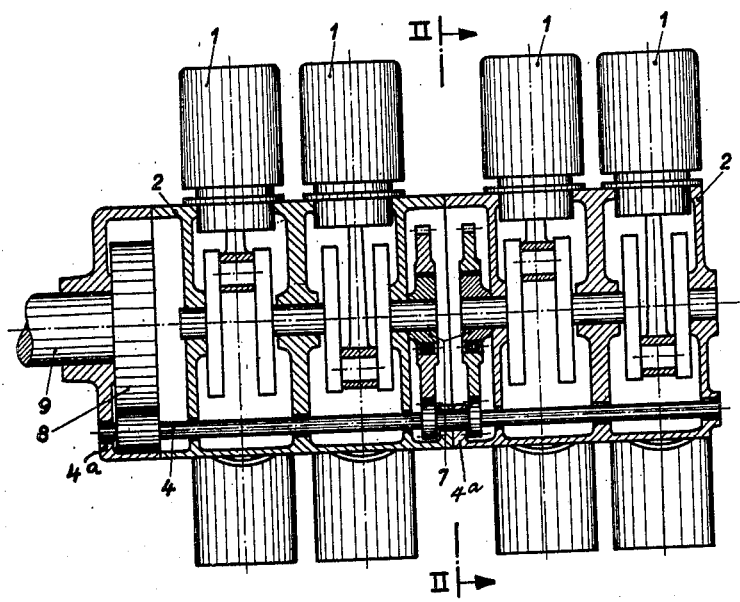
Figure 1 is a sectional side elevation of a driving mechanism according to the invention employing two double radial engines.
Figure 2:
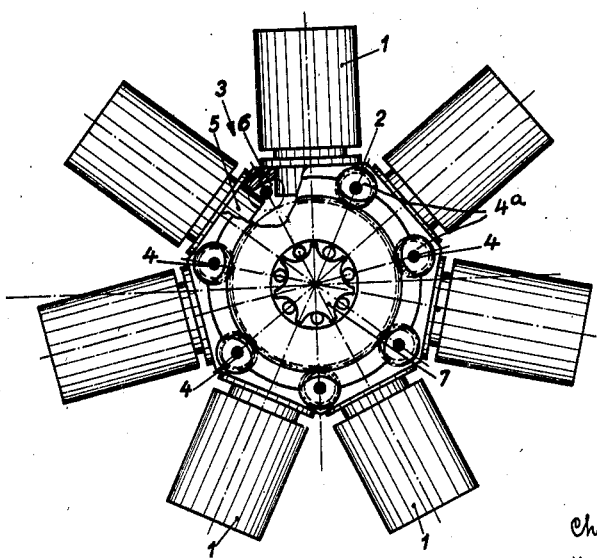
Figure 2 is an end view of a single radial engine along the line II—II in Figure 1.

Referring to Figures 1 and 2 of the drawings, a plurality of air-cooled double radial engines are so arranged that the individual cylinders 1 thereof are in rows approximately one behind the other. In the gaps 3 between the cylinders 1 or in the crank casing 2 are by-pass shafts 4, there preferably being a plurality of such shafts. The by-pass shafts 4 are preferably mounted in the crank casings 2 in positions in which they do not interfere with the connection rods or the crank shafts. If the cylinders 1 are connected to the crank casing at the lower parts 5 thereof, the spaces 6 thereby formed between adjacent cylinder ends can be utilized for this purpose, as shown in part section in Figure 2. The by-pass shafts 4 extend parallel to the crank shafts and are so connected therewith by means of couplings 7 in the form of overrunning clutches that on the failure or cutting out of one of the engines the remaining engine or engines is or are connected through the by-pass shafts 4 and preferably through a gear train 8 to the airscrew shaft 9. If the reduction afforded by the gear train 8 is insufficient for the airscrew a supplementary airscrew reduction gear can be employed. In this manner it is possible to connect in series as many engines as desired by a suitable corresponding arrangement of the clutches with respect to the by-pass shafts 4.

If a plurality, for example two, double radial engines are connected in series, assembly may be facilitated by providing by-pass shafts for each engine and end flanges (not shown) for coupling the shaft-sections of one engine to the corresponding sections of the next engine. The couplings may be flexible if desired and the bearings 4a for the by-pass shafts may be formed on the engine housing 2 or on a separate chassis frame.

Various modifications of the above described arrangement are shown diagrammatically in Figures 3 to 9.

Referring to Figure 3, the crank shaft 10 of one engine is connected through a flexible coupling 11 to an overrunning coupling 7a, the driving wheel 12 of which is directly connected to the airscrew shaft 9. The crank shafts 10a, 10b, etc., of the other engines each preferably have at one end thereof a coupling 7b, the driving wheel 12a of which is connected, through a spur wheel 13 and a by-pass shaft 4 through a further spur wheel 14 to the driving wheel 12. By-pass shafts 4' are connected to further engines, not shown, which are to be coupled in series. If one of the engines fails, for example that having the crank shaft 10, then the engine with the crank shaft 10a continues to drive the airscrew shaft 9 through the by-pass shafts 4, whilst the overrunning clutch 7a disconnects the crank shaft 10 so that the engine remains stationary.

The torque of the engines can preferably be so transmitted by speeding up transmission that in consequence of the increased speed of rotation of the shafts 4 a reduction in the diameter thereof is possible so as to compensate for driving shocks arising in the engine, sagging of the housings or the like caused by the twisting and bending thereof so that for example the gears are protected. Airscrew shocks or the like are also absorbed.

If, as shown by Figure 4, the ends of the crank shafts 10 and 10a are turned towards each other so as to drive the airscrew, each through a clutch 7a and 7b, respectively, a common driving wheel 15, pinions 13 and the by-pass shafts 4, then these transmit the full torque of all the engines, the advantage being that a multi-part transmission 16 can be used, so that the shafts 4 can rotate at a higher speed relatively to that of the crank shafts. The shafts 4 in common then drive the driving wheel 12 and thus the airscrew shaft 9, where, by a further suitable dimensioning of the spur wheels, a reduction in the speed can be effected.

A modification of the arrangement according to Figure 4 is shown in Figure 5 in which the possibility of stepping up the speed by subdivision into a multi-part transmission 16, is shown clearly, the clutches 7a and 7b actuating separate driving wheels 15a and 15b, respectively.

It is desirable, as shown in Figure 6, positively to connect the by-pass shafts 4 through spur wheels 17 to the crank shafts. The ends of the shafts 4 directed for example towards the airscrew shaft 9 are then, corresponding to the number of the engines, connected to the airscrew shaft through separate clutches 7a, 7b associated with each engine, in such a manner that shocks or the like produced by the engines are absorbed by the shafts and thereby isolated from the clutches and the airscrew shaft, so that immediately any one engine fails the corresponding by-pass shafts cease to rotate, thus requiring no driving energy from the remaining engines.

The by-pass shafts 4 provided laterally can preferably be so connected to the crank shafts that the by-pass shafts rotate synchronously with the engine in such a manner that when an engine fails or is cut out the position of the shafts relatively thereto is not altered. It is also possible to drive from the by-pass shafts any auxiliary apparatus such as fans or the like.

The advantage of providing a plurality of by-pass shafts 4 is that the diameter thereof can be small and the transmission of energy from the crank shafts to the airscrew shaft is subdivided so that there is only a low pressure produced on the flanks of the gear teeth, thus enabling small spur wheels to be employed. This contributes considerably to the realisation of a very compact and reliable construction, so that in particluar with air-cooled engines the crank casing does not need to be considerably enlarged and with the arrangement of the by-pass shafts in the gaps between adjacent cylinders the passage necessary for the current of cooling air is not restricted.

As shown in Figures 7 to 9 the arrangements of by-pass shafts, couplings or overrunning clutches illustrated diagrammatically in Figures 3 to 6 can be modified, in particular when two engines are to be coupled to form one driving mechanism, by arranging those parts together at 19 between the two engines 17, 18, so that a driving mechanism unit is derived which, by simple rotation thereof through an angle of 180°, that is, turning the motor end for end, can be used for clockwise or counterclockwise operation. In the case of Figure 7 the clutches 7a and 7b are displaced to the outside but the main features of the embodiment shown in Figure 3 are retained.

Figure 8 also illustrates a driving mechanism having the apparatus part 19 mounted between two engines, the arrangement corresponding to Figures 4 and 5 with a displacement of the overrunning clutches 7a and 7b to the outside. Similarly, the arrangement shown in Figure 9 corresponds to that according to Figure 6. In addition, with this embodiment there is the further advantage that all of the clutches 7a and 7b can be combined separately for example in the neighbourhood of the airscrew gear or can even be combined therewith, so that the driving mechanism unit with the apparatus part 19 has simply the outlets of the by-pass shafts 4 which are suitably flanged on to the couplings or on to the airscrew gear casing. It is possible in this manner to effect with comparatively few basic types any desired combination of driving mechanism either for clockwise or counterclockwise rotation.

What we claim as our invention and desire to secure by Letters Patent of the United States is:

1. A power plant comprising in combination a plurality of internal combustion engines, each engine comprising a driven shaft, a crank case and a plurality of annularly spaced cylinders projecting radially from said case, the cylinders of the power plant being arranged in longitudinal rows, a plurality of by-pass shafts disposed around the axis of the engines, bearings for said by-pass shafts housed in said crank cases and located in the spaces between the inner ends of adjacent rows of cylinders, and transmission means between said by-pass shafts and said driven shafts.

2. A power plant according to claim 1 in which each of said engines includes a plurality of longitudinal rows of cylinders.

3. A power plant according to claim 1 in which said by-pass shafts are symmetrically disposed around the axis of the engines.

CHRISTIAN SCHMITZ.
HERMAN ZUMPE.